United States Patent [19]

Davis

[11] 3,929,725

[45] Dec. 30, 1975

[54] PROCESS FOR STABILIZING POLYAMIDES

[75] Inventor: John M. Davis, Signal Mountain, Tenn.

[73] Assignee: E. I. Du Pont de Nemours & Co., Wilmington, Del.

[22] Filed: July 31, 1974

[21] Appl. No.: 493,394

[52] U.S. Cl. 260/45.75 C; 260/45.7 R; 260/45.7 P; 260/45.9 NP
[51] Int. Cl.² ............................................. C08G 6/00
[58] Field of Search.... 260/45.75 C, 45.7 R, 45.7 P, 260/45.9 NP

[56] References Cited
UNITED STATES PATENTS

| | | | |
|---|---|---|---|
| 2,705,227 | 3/1955 | Stamatoff | 260/45.7 |
| 2,960,489 | 11/1960 | Gabler et al. | 260/45.75 |
| 3,173,898 | 3/1965 | Sum | 260/45.75 |
| 3,377,314 | 4/1968 | Anton | 260/45.75 |
| 3,658,705 | 4/1972 | Evers et al. | 260/45.75 |

FOREIGN PATENTS OR APPLICATIONS 945,186   12/1963   United Kingdom

*Primary Examiner*—V. P. Hoke

[57] ABSTRACT

An improved process insuring reduced copper deposition is disclosed for the manufacture of heat- and oxygen-stabilized polyamide compositions and filaments.

10 Claims, No Drawings

PROCESS FOR STABILIZING POLYAMIDES

BACKGROUND OF THE INVENTION

This invention relates to an improved process for preparing stabilized polyamides containing copper compounds.

In producing synthetic, linear polyamides, it has been found desirable to add stabilizers to the polyamides, particularly when yarns made from the polyamides are to be subjected to treatments at elevated temperatures. Copper compounds such as cupric acetate and nitrate have been proposed as stabilizers, see Br. Patent Nos. 839,067 and Br. 1,131,933. In U.S. Pat. No. 2,705,227, Stamatoff discloses that copper compounds such as cupric acetate in combination with an inorganic halide, a phosphorous compound and a phenolic oxidation inhibitor provide heat stable polyamide yarns.

It is also desirable to include an antioxidant to a polyamide-forming mix to reduce deterioration which results from the inability to completely exclude air from the apparatus used in the production of the polyamides. In U.S. Pat. No. 3,078,248, Ben teaches that organic phosphinate compounds are advantageously incorporated into polyamide compositions.

The use of copper compounds to stabilize polyamides is accompanied by a tendency of copper to separate from the composition and this tendency becomes more pronounced in the presence of the organic phosphinates.

It has now been found that polyamides stabilized with copper compounds can be produced in the presence of a phosphinate antioxidant with greatly reduced copper deposition.

SUMMARY OF THE INVENTION

The present invention provides an improved process for producing polyamides resistant to deterioration due to heat and oxygen. The process involves incorporating cupric nitrate, an inorganic halide and a hypophosphorous compound into a polyamide-forming salt solution and then polymerizing the salt to form the polymer. The cupric ion is added as cupric nitrate or an amount of nitric acid at least equivalent to the amount of cupric ion is added if another polyamide-soluble cupric salt is used. The loss of cupric ion from the polymer composition due to deposition of copper is significantly reduced.

PREFERRED EMBODIMENTS OF THE INVENTION

In accordance with the present invention there is provided an improved process for polymerizing polyamide-forming compositions containing a copper compound, an inorganic halide and a hypophosphorous compound which comprises adding the copper compound to the polymerization mixture in the form of 1) cupric nitrate or 2) another polyamide-soluble cupric salt and an amount of nitric acid, in equivalents, of about one to three times the number of equivalents of the copper salt.

The copper compound used may be a cupric salt which is soluble in the polyamide. As suitable cupric salts there may be mentioned cupric nitrate, cupric acetate, cupric laurate, cupric stearate and the like. The cupric salt should be used in an amount sufficient to provide from about 20 to about 100 parts by weight (calculated as copper) per million parts by weight of polymer.

The inorganic halide is preferably an alkali metal halide such as, for example, potassium and sodium bromide and iodide. The amount of inorganic halide used should be from about 5 to 50, preferably about 10 to about 20, times the weight of the cupric salt calculated as cupric nitrate.

The hypophosphorous compound is a compound of the formula

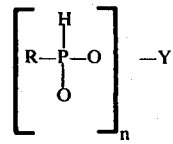

where
R is hydrogen or an alkyl, cycloalkyl, aralkyl, aryl or alkaryl group,
Y is hydrogen, a metal or an amine
n is a whole number corresponding to the valence of Y.

Preferred hypophosphorous compounds are phenylphosphinic acid, sodium phenylphosphinate, potassium phenylphosphinate and hexamethylene diammonium phenylphosphinate. The amount of hypophosphorous compound used should be from about 0.03 to about 0.5 percent, preferably 0.15 to 0.33 percent, by weight, based on the weight of the polyamide.

The additives are incorporated into the polyamide-forming mixes such as aqueous solutions of hexamethylenediammonium adipate and the polymer is prepared by a conventional polymerization technique such as described in the aforementioned U.S. Pat. No. 3,078,248 or in U.S. Pat. No. 3,357,955. The particular technique employed in the examples is for purposes of illustration only.

The stabilized polyamides prepared in accordance with the practice of the present invention may be any of the synthetic linear polyamides. The invention is preferably used in the production of stabilized polyamides useful for industrial yarns, for example, tire yarns. Preferably it is used in the production of stabilized poly(hexamethylene adipamide) and its copolymers, particularly those formed from a major amount of hexamethylene diammonium adipate and a minor amount of epsilon aminocaproic acid or its lactam.

The amount of copper in the polymer is determined by a conventional X-ray method of chemical analysis (see Applied Inorganic Analysis 2nd Ed., Wiley & Sons, N.Y., Copyright 1953, pages 153–155) of the filaments. Filaments produced from polyamide-forming compositions to which the copper salt has been added are formed into a skein and the skein is clamped with 2 clamps about 2 inches apart. The skein is cut near the clamps and a cut end of the clamped section is then analyzed for copper content using the first method described at page 153 of the aforementioned publication.

The expression "relative viscosity" (RV) as used herein signifies the ratio of the flow time in a viscometer of a polymer solution relative to the flow time of the solvent by itself measured in the same units at 25°C. The relative viscosity is determined using an 8.4 weight % solution of polymer in a 90/10 w/w formic acid-water solution.

In the example that follows, all percentages are by weight based on the weight of the solution or the polymer as the case may be.

EXAMPLE

This example illustrates the practice of the invention in reducing the loss of copper during the polymerization and extrusion of polyhexamethyleneadipamide (6,6-nylon).

Item A. (Control) To approximately 1061 kg. of about a 50% by weight aqueous solution of hexamethylenediammonium adipate are added about 870 grams (0.19 weight % based on the weight of the polymer to be formed) of potassium phenylphosphinate, about 4.137 kg. of a 2.5% aqueous solution of cupric acetate monohydrate (1.036 equivalents) and about 4.137 kg. of a 2.5% aqueous solution of potassium iodide. The solution is stirred until all solids have dissolved.

This polyamide-forming salt solution is fed to a conventional continuous polymerization apparatus similar to the type disclosed in Bryan U.S. Pat. No. 3,357,955 except that a finisher is employed rather than the equilibrator shown in Bryan. Thus, the solution is passed to an evaporator operated at about atmospheric pressure where it is concentrated to about 65 percent salt. The concentrated solution is then passed to a reactor operated at about 250 psig where the solution is heated to about 235°C. and more water is removed. A composition containing about 92 percent salt leaves the reactor and passes to the flasher which is basically a tube of sections of successively increasing diameter. The temperature in the flasher is about 280°C. The pressure is about 400 psig at the entrance of the flasher and is at or near atmopsheric pressure at the exit. The polymer formed in the flasher (R.V. about 13) then flows to a separator held at about 280°C. which separates the polymer and steam. The polymer leaving the separator has an RV of about 30. It then passes to a vacuum finisher where the RV increases further to about 45. The polymer leaving the finisher is forwarded along a transfer line to a spinning machine. In its passage (while kept hot) to the spinning machine, its relative viscosity increases to about 80. Means are provided at this point for the removal of some polymer which can be used for analysis. Discs having a diameter of about 3 cm. and a uniform thickness of about 0.6 cm. are formed from polymer so removed and the copper content is measured and reported in the Table below. The polymer is then spun into filaments and drawn.

Item B. To a similar batch of polyamide-forming salt solution as prepared in item A above, there is added 92 grams of 71% nitric acid solution (1.036 equivalents) and 696 grams (dry weight) of hexamethylene diamine as a concentrated (about 90 percent) aqueous solution. The solution is stirred until all solids have dissolved and polymer is formed and spun into filaments as before.

Item C. A further batch of polyamide-forming salt solution is prepared as in item A above, except that 125.2 grams of cupric nitrate trihydrate (1.036 equivalents) dissolved in one liter of distilled water is added in place of the cupric acetate monohydrate solution. The solution is stirred until all solids have dissolved and polymer is prepared and spun as before.

Samples of the above-described polymer and filaments are then analyzed for parts of copper per million parts of polymer (ppm.). Results are shown in the Table. The data obtained for the above series of experiments were determined on product produced after the process had been in operation for a length of time corresponding to 1 to 2 times the hold-up time of the system in order to reduce any variation in results due to presence of copper which may be in the system from a previous run.

TABLE

| Item | Copper Salt Added (ppm.)* | Copper Determined In Disc Polymer** | Copper Determined In Yarn Polymer | % Copper Loss Disc Polymer | % Copper Loss Yarn Polymer |
|---|---|---|---|---|---|
| A(Control) | 72 | 45 (6) | 58 (2) | 38 | 19 |
| B | 72 | 59 (7) | 64 (2) | 18 | 11 |
| C | 72 | 60 (6) | 65 (2) | 17 | 10 |

*Based on weight of polymer to be formed.
**Numbers in parentheses are the number of determinations averaged to give the value reported.

The analyses indicate a significant reduction in copper loss in practice of items B and C, the process of the invention.

What is claimed is:

1. A process for producing polyamides resistant to deterioration that is caused by heat and oxygen comprising incorporating into a polyamide-forming salt solution, cupric nitrate, an inorganic halide, and a hypophosphorous compound and then polymerizing the salt to form the polymer.

2. The process of claim 1 wherein the cupric nitrate is added in an amount to provide from about 20 to about 100 parts by weight of copper per million parts by weight of polymer to be produced.

3. The process of claim 2 wherein the inorganic halide is selected from the group of potassium bromide, potassium iodide, sodium bromide and sodium iodide, and is added in an amount of from about 5 to 50 times the weight of the cupric nitrate.

4. The process of claim 1 wherein the hypophosphorous compound is a compound of the formula $$\left[ R-\underset{O}{\overset{H}{\underset{|}{P}}}-O \right]_n -Y$$

where
R is hydrogen or an alkyl, cycloalkyl, aralkyl, aryl or alkaryl group,
Y is hydrogen, a metal or amine
n is a whole number corresponding to the valence of Y.

5. The process of claim 4 wherein the hypophosphorous compound is selected from the group of phenylphosphinic acid, sodium phenylphosphinate, potassium phenylphosphinate and hexamethylene diammonium phenylphosphinate.

6. The process of claim 5 wherein the hypophosphorous compound is potassium phenylphosphinate which is present in an amount of from about 0.03 to about 0.5 percent by weight based on the weight of the polyamide to be produced.

7. The process for producing polyamides resistant to deterioration due to heat and oxygen comprising incorporating into a polyamide-forming salt solution a polyamide-soluble cupric salt and an amount of nitric acid, in equivalents, equal to from about one to three times the number of equivalents of the copper salt, an inorganic halide, and a hypophosphorous compound and then polymerizing the salt to form the polymer.

8. The process of claim 7 wherein the copper salt is cupric acetate.

9. The process of claim 8 in which the cupric acetate is added in an amount to provide from about 20 to about 100 parts by weight of copper per million parts by weight of polymer.

10. The process of claim 7 wherein the polyamide-forming salt is hexamethylene diammonium adipate.

* * * * *